US010661468B2

(12) United States Patent
Chi

(10) Patent No.: US 10,661,468 B2
(45) Date of Patent: May 26, 2020

(54) LINEAR SAW, AND MACHINING METHOD AND NUMERICAL CONTROL MACHINING DEVICE THAT USE SAME

(71) Applicant: Dongguan City Yisong High Technology Co., Ltd., Dongguan, Guangdong (CN)

(72) Inventor: Yihui Chi, Guangdong (CN)

(73) Assignee: DONGGUAN CITY YISONG HIGH TECHNOLOGY CO., LTD., Guangdong (CN)

( * ) Notice: Subject to any disclaimer, the term of this patent is extended or adjusted under 35 U.S.C. 154(b) by 146 days.

(21) Appl. No.: 15/520,019

(22) PCT Filed: Oct. 21, 2015

(86) PCT No.: PCT/CN2015/092424
§ 371 (c)(1),
(2) Date: Apr. 18, 2017

(87) PCT Pub. No.: WO2016/062249
PCT Pub. Date: Apr. 28, 2016

(65) Prior Publication Data
US 2017/0320228 A1     Nov. 9, 2017

(30) Foreign Application Priority Data
Oct. 22, 2014   (CN) ........................... 2014 1 0568604

(51) Int. Cl.
*B27B 33/16*     (2006.01)
*B27B 33/02*     (2006.01)
(Continued)

(52) U.S. Cl.
CPC .......... *B27B 33/16* (2013.01); *B23D 57/0007* (2013.01); *B23D 59/001* (2013.01);
(Continued)

(58) Field of Classification Search
CPC ......... B27B 33/00; B27B 33/02; B27B 33/04; B27B 33/06; B27B 33/08; B27B 33/10;
(Continued)

(56) References Cited

U.S. PATENT DOCUMENTS 14,305 A     2/1856   Coffin
2,763,298 A * 9/1956  Tomkies ................. B27B 33/02
                                                    83/851
(Continued)

FOREIGN PATENT DOCUMENTS

CN       1039199 A    1/1990
CN       1238253 A    12/1999
(Continued)

OTHER PUBLICATIONS

International Preliminary Report in corresponding PCT Application No. PCT/CN2015/092424, dated Apr. 25, 2017.
(Continued)

*Primary Examiner* — Jason Daniel Prone
*Assistant Examiner* — Richard D Crosby, Jr.
(74) *Attorney, Agent, or Firm* — Leason Ellis LLP

(57) ABSTRACT

A linear saw, machining method using the same and numerical controlled machining device. The linear saw has: a machining part (1), for cutting a machining object in a linearly extending direction of the linear saw, and generating a slot on the machining object; and the linear saw further includes a space-keeping part (2) arranged such that the whole linear saw does not contact the slot or is not subject to an acting force of the slot when the space-keeping part passes through the slot. As the linear saw is provided with a space-keeping structure, the linear saw has time and space to recover from a deformation generated by cutting the
(Continued)

machining object, thus effectively preventing accumulated errors, and greatly improving the position precision of the machining seam.

19 Claims, 8 Drawing Sheets

(51) Int. Cl.
   *B23D 61/12* (2006.01)
   *B23D 57/00* (2006.01)
   *B23D 59/00* (2006.01)
   *B23D 61/18* (2006.01)
   *B27B 19/04* (2006.01)

(52) U.S. Cl.
   CPC ......... *B23D 61/121* (2013.01); *B23D 61/185* (2013.01); *B27B 19/04* (2013.01); *B27B 33/02* (2013.01)

(58) Field of Classification Search
   CPC ......... B27B 33/12; B27B 33/16; B23D 57/00; B23D 57/0007; B23D 57/0015; B23D 57/0023; B23D 59/001; B23D 61/00; B23D 61/12; B23D 61/121; B23D 61/123
   See application file for complete search history.

(56) References Cited

U.S. PATENT DOCUMENTS

| | | | | |
|---|---|---|---|---|
| 2,839,110 A * | 6/1958 | Carpenter | ............... | B27B 25/10 7/105 |
| 3,005,478 A * | 10/1961 | Laviano | ............... | B23D 61/121 30/123 |
| 3,789,450 A * | 2/1974 | Mozdenski | ............ | B44D 3/164 15/105 |
| 3,990,334 A * | 11/1976 | Mellgren | ................ | B27B 33/02 83/56 |
| 4,265,285 A * | 5/1981 | Fodor | .................. | B23D 61/121 30/166.3 |
| 4,339,977 A * | 7/1982 | Miller | ................... | B23D 61/121 83/848 |
| 4,807,366 A | 2/1989 | Masato et al. | | |
| 4,890,387 A * | 1/1990 | Canino | ................... | B26B 5/001 30/162 |
| 5,213,022 A | 5/1993 | Elgan | | |
| 5,546,625 A * | 8/1996 | Mealey, Sr. | ............. | B05C 21/00 15/105 |
| 5,697,835 A * | 12/1997 | Nitz | ..................... | B23D 61/006 125/15 |
| D402,516 S * | 12/1998 | Okada | ............................ | D8/20 |
| 5,901,451 A * | 5/1999 | Nakayama | ............... | A01G 3/08 30/501 |
| 5,979,058 A * | 11/1999 | Henke | ........................ | B26B 9/02 30/143 |
| 6,119,571 A * | 9/2000 | Hayden, Sr. | ......... | B23D 61/121 83/661 |
| 6,149,510 A * | 11/2000 | Romagnoli | .......... | B23D 61/123 125/12 |
| 6,497,046 B1 * | 12/2002 | Bardeen | ................ | B23D 51/01 30/342 |
| 6,829,973 B1 * | 12/2004 | Yang | .................... | B23D 61/021 30/166.3 |
| 7,036,415 B2 | 5/2006 | Tsujimoto | | |
| 7,451,677 B2 * | 11/2008 | Souza | ................... | B23D 61/02 56/13.7 |
| 8,210,081 B2 * | 7/2012 | Elliston | ................ | B23D 61/121 83/835 |
| D693,661 S * | 11/2013 | Fosberg, Jr. | ..................... | D8/20 |
| 9,375,796 B2 * | 6/2016 | Elliston | ................ | B23D 61/121 |
| 9,702,153 B2 * | 7/2017 | Kehoe | ................. | E04F 21/0084 |
| 9,731,365 B2 * | 8/2017 | Cranna | ................ | B23D 61/121 |
| 9,821,391 B2 * | 11/2017 | Tsujimoto | ............ | B23D 61/121 |
| 9,908,231 B2 * | 3/2018 | Levand | ................... | B08B 1/005 |
| 2001/0039738 A1 * | 11/2001 | Bachta | ................... | B23D 49/11 30/517 |
| 2002/0029484 A1 * | 3/2002 | Takeuchi | ............... | B23D 51/10 30/517 |
| 2003/0089215 A1 * | 5/2003 | Alton | ................... | B23D 61/121 83/848 |
| 2003/0106407 A1 | 6/2003 | Wuensch et al. | | |
| 2005/0262702 A1 * | 12/2005 | Hawthorn | ............ | B23D 61/126 30/166.3 |
| 2006/0107537 A1 * | 5/2006 | Miller | .................. | B23D 61/123 30/501 |
| 2006/0207398 A1 * | 9/2006 | Nicolson | ................ | B23D 61/04 83/13 |
| 2007/0199416 A1 * | 8/2007 | Cook | ................... | B23D 61/121 83/13 |
| 2009/0031568 A1 * | 2/2009 | Yang | ...................... | B23D 53/12 30/353 |
| 2010/0218389 A1 * | 9/2010 | Kalomeris | ........... | B23D 61/128 30/392 |
| 2012/0023755 A1 * | 2/2012 | Croce | ...................... | A01B 1/16 30/166.3 |
| 2012/0042765 A1 * | 2/2012 | Kazda | ................... | B23D 49/11 83/835 |
| 2012/0090443 A1 * | 4/2012 | Butzen | ................ | B23D 61/121 83/849 |
| 2012/0204353 A1 * | 8/2012 | Chu | ........................ | B26B 1/042 7/118 |
| 2013/0174701 A1 * | 7/2013 | Elliston | ................ | B23D 61/126 83/34 |
| 2013/0227844 A1 * | 9/2013 | Kazda | .................. | B23D 61/123 30/392 |
| 2013/0228059 A1 * | 9/2013 | Kazda | .................. | B23D 61/121 83/835 |
| 2013/0255016 A1 * | 10/2013 | Berney | ................. | E04F 21/163 15/105 |
| 2014/0090537 A1 | 4/2014 | Campbell et al. | | |
| 2015/0075675 A1 * | 3/2015 | Andersson | ................ | B27F 1/02 144/371 |
| 2017/0190072 A1 * | 7/2017 | Miyawaki | ................ | B27B 21/00 |
| 2017/0320228 A1 * | 11/2017 | Chi | ......................... | B27B 33/16 |

FOREIGN PATENT DOCUMENTS

| | | |
|---|---|---|
| CN | 2767027 Y | 3/2006 |
| CN | 103273541 A | 9/2013 |
| CN | 103717363 A | 4/2014 |
| CN | 104339422 A | 2/2015 |
| CN | 204278141 U | 4/2015 |
| EP | 0949034 A2 | 10/1999 |
| JP | 61136722 A | 6/1986 |
| WO | WO 2009074381 A1 | 6/2009 |

OTHER PUBLICATIONS

International Search Report in corresponding PCT Application No. PCT/CN2015/092424, dated Jan. 27, 2016.
Indian Examination Report in corresponding Indian Patent Application No. 201727016465 dated Jul. 11, 2019 (an English translation attached hereto). 7 pages.
Chinese Office Action and Search Report in corresponding Chinese Application No. 201410568604.6 dated Oct. 9, 2015 (an English translation attached hereto). 23 pages.

* cited by examiner

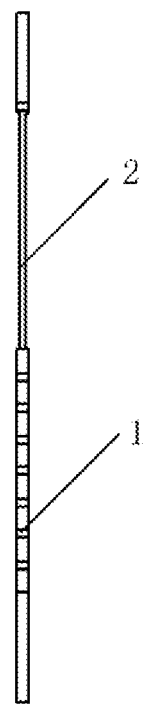
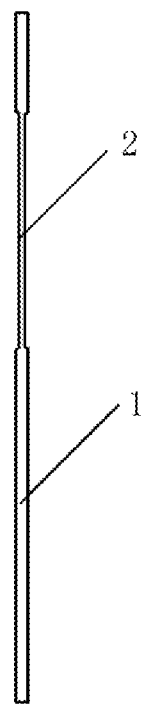
FIG. 4a　　　　　FIG. 4b　　　　　FIG. 4c
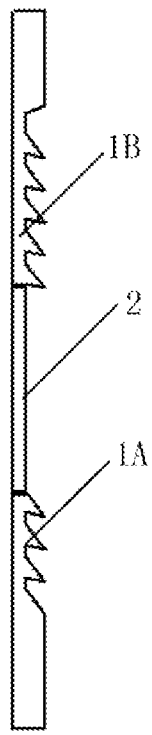
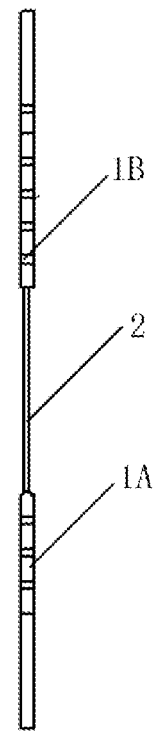
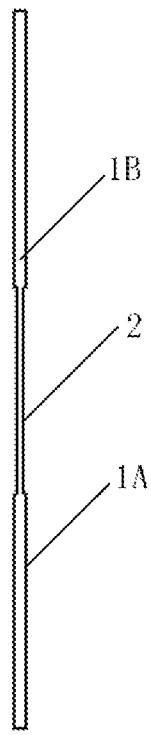
FIG. 5a　　　　　FIG. 5b　　　　　FIG. 5c

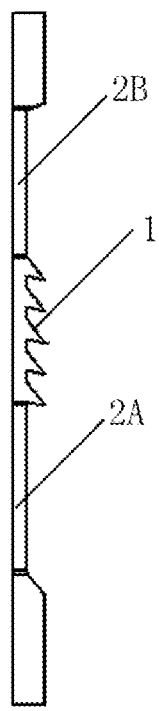 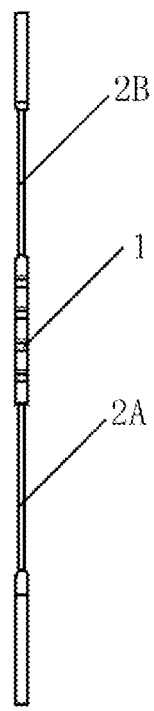 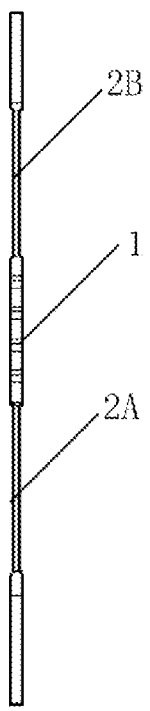
FIG. 6a      FIG. 6b      FIG. 6c
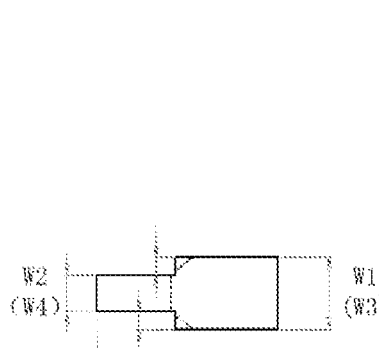 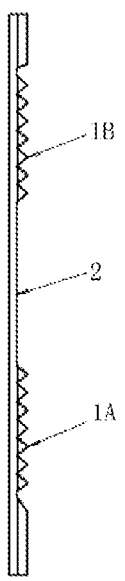 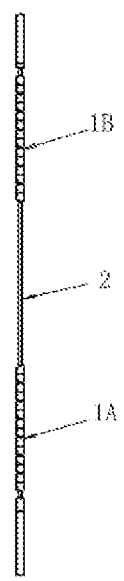 
FIG. 7d      FIG. 7a   FIG. 7b   FIG. 7c

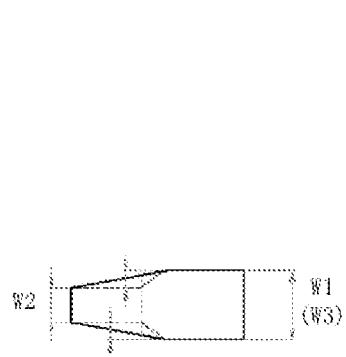
FIG. 8d
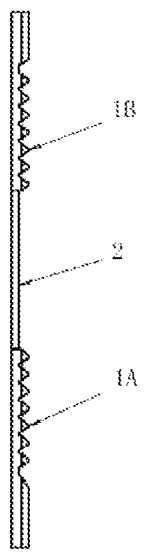
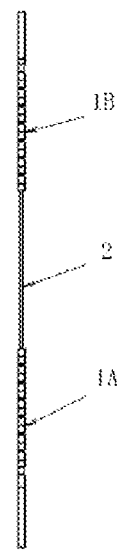
FIG. 8a　FIG. 8b　FIG. 8c
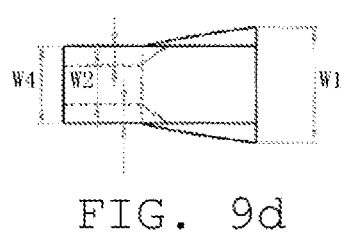
FIG. 9d
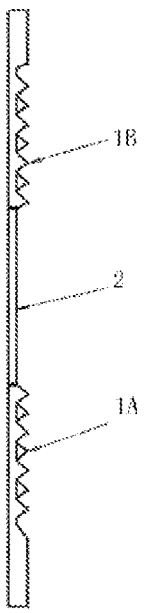
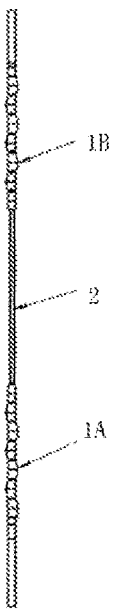
FIG. 9a　FIG. 9b　FIG. 9c

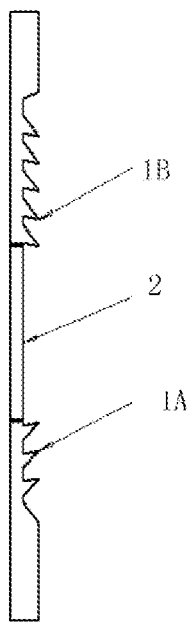 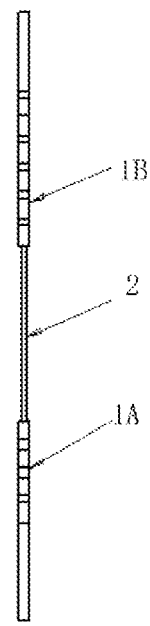 
FIG. 10a  FIG. 10b  FIG. 10c
 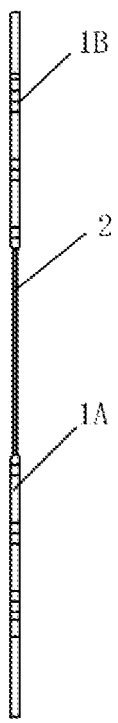 
FIG. 11a  FIG. 11b  FIG. 11c

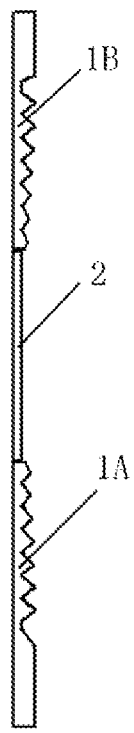 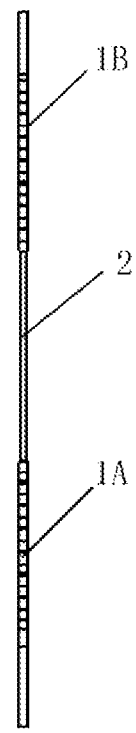 
FIG. 12a    FIG. 12b    FIG. 12c
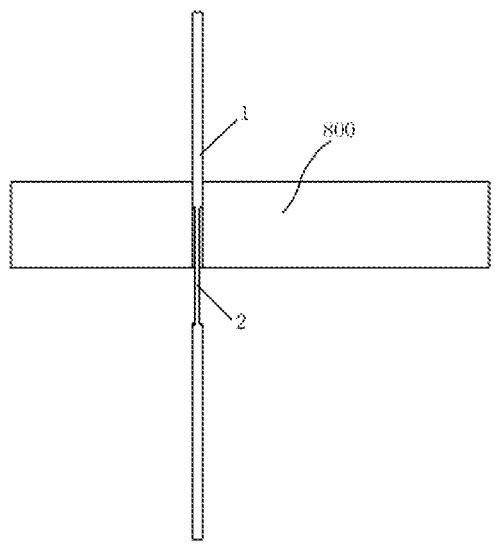 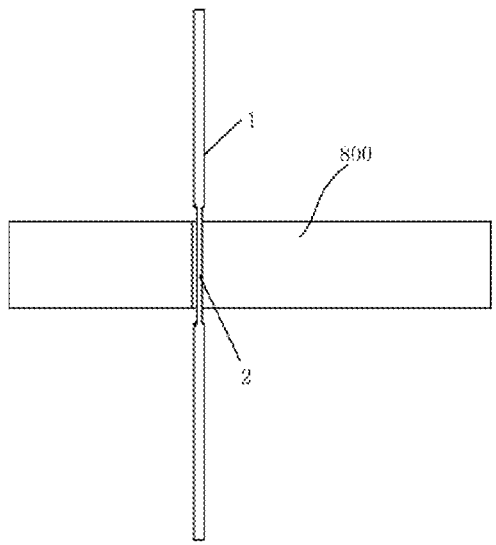
FIG. 13a    FIG. 13b

LINEAR SAW, AND MACHINING METHOD AND NUMERICAL CONTROL MACHINING DEVICE THAT USE SAME

CROSS-REFERENCE TO RELATED PATENT APPLICATIONS

This application is a U.S. National Phase Application under 35 U.S.C. § 371 of International Patent Application No. PCT/CN2015/092424, filed Oct. 21, 2015, and claims the priority CN 201410568604.6, filed Oct. 22, 2014, all of which are incorporated by reference in their entireties. The International Application was published on Apr. 28, 2016 as International Publication No. WO 2016/062249 A1.

FIELD OF THE INVENTION

The present invention relates to the field of machining tools, and more particularly to a saw blade for machining a board, and a machining method and a numerical control machining device that use the saw blade.

BACKGROUND

A linear saw blade is a cutting tool frequently used in a current hand saw and electric saw. After being mounted on the hand saw or the electric saw, the saw blade is subjected to an opposite-direction backward force from a workpiece in a forward direction and saw teeth are subjected to upward and downward opposite-direction forces during an upward and downward movement of the saw blade. As a result, the saw blade often deforms during machining, where the saw blade may deform in a linear direction or deform in a direction vertical to the linear direction. In addition, because the saw blade has elasticity, some error is produced when the saw blade is mounted.

Due to many factors such as deformation of the saw blade under a stress, an error of a machine tool, and properties of the workpiece, the linear saw usually produces a machining error during each time of cutting and machining, and a value of the machining error varies each time. The errors accumulate till the saw blade deforms to the highest degree. Because the saw tooth or saw teeth contact the workpiece all the time in a machining process of the current saw blade, deformation produced during previous machining cannot be eliminated, and retain and accumulate all the time, to form an accumulated error, which affects machining precision and further shortens service life of the saw blade.

The aforementioned technical problems of the traditional linear saw are specifically described below by using an example of forming a straight gap on a wooden board.

During an upward and downward movement of the linear saw, stress (a force acting by a workpiece on saw teeth) in a vertical direction (a Z-axis direction) is exerted, and this direction does not coincide with a central line of the linear saw, thereby generating torque. Moreover, a saw blade used for forming a gap is generally thin, and its rigidity is insufficient in a direction vertical to a plane in which the saw tooth or saw teeth and a saw back locate. Therefore, the saw blade bends, and two sides of the saw blade usually bend, that is, a bend usually appears in a Y-axis direction, as shown in FIG. 1.

In addition, during machining, the saw blade is usually subjected to unbalanced stress on the left and right sides under the influence of many factors such as heterogeneous materials of the machined wooden board. The saw blade also bends during machining when being subjected to uneven stress. The saw blade may deviate from a machining position and a machining direction due to the bend, so that a position of the saw blade and a position of the to-be-machined straight gap are not on the same line. An X-axis direction of the saw blade cannot keep parallel with the to-be-machined straight line and a deviation angle is formed therebetween, as shown in FIG. 2a and FIG. 2b. In the figures, a black segment indicates the linear saw, FIG. 2a shows a straight-line machining effect (also can be regarded as an ideal straight-line machining effect) at an initial state, and FIG. 2b shows a straight-line machining effect in which a deviation angle is formed.

After the deformation of the saw blade results in deviation in a machining path, due to certain height of the saw tooth or saw teeth and certain thickness of the machined wooden board, the saw tooth or saw teeth are clamped in the gap which is previously formed by cutting and deviates at a certain angle, so that the saw blade continuously advances and operates at the deviation angle as before. In this way, the saw blade deviates farther and farther, which leads to an accumulated deviation, or in other words, an accumulated machining error. FIG. 2b additionally shows a certain accumulated deviation. Further, in order to ensure a straight-line machining position, the two ends of the linear saw usually stay in the Z-axis direction. As a result, as a machining path deviates at a bigger angle, the linear saw deforms to a higher degree. That is to say, during accumulation of the machining errors, deformation errors of the linear saw also accumulate.

In addition, the deformation of the saw blade further leads to an opposite-direction restoring force which can straighten the saw blade. Because the aforementioned deformation accumulates and worsens, when the restoring force produced due to the deformation of the saw blade is greater than a deviation clamping force produced due to gap deviation, the saw blade begins to restore towards a direction opposite to the deviation, and a machining path deviates towards a direction opposite to a deviation direction shown in FIG. 2b, till the saw blade returns to a straight-line machining position (FIG. 2c). Then, the saw blade continuously operates in a direction (probably opposite to or identical with the direction in FIG. 2b) to produce machining error accumulation and deformation accumulation (FIG. 2d), till returns to the straight-line machining position again (FIG. 2e).

Such a process in which the saw blade deviates towards one direction, returns to the straight-line machining position, deviates again, and then returns to the straight-line machining position again repeatedly occurs, so that the formed line is not straight and a machining path changes all the time, and typically, an S-shaped machining path is formed. Moreover, if the produced deviation clamping force is so high that the saw blade deforms to an unbearable degree, and the saw blade is probably broken. In an existing solution, to decrease the accumulated error and make improvement, only the following paths can be used: strengthen the rigidity of the saw blade, decrease an error of the machine tool, and optimize the properties of the workpiece. However, the error cannot be eliminated fundamentally, thereby leading to low machining position precision of the existing linear saw.

SUMMARY

To prevent an accumulated error during machining of a saw blade and improve machining position precision, an aspect of the present invention provides a linear saw, which includes: a machining part, used for cutting a workpiece along a linear extension direction of the linear saw and forming a machined slot in the workpiece. The linear saw further includes a space-keeping part, which is disposed so that the entire linear saw doe not contact the machined slot or is not subjected to an acting force from the machined slot when the space-keeping part passes through the machined slot.

According to the linear saw in the embodiments of the present invention, for example, a length of the space-keeping part is greater than a thickness of the workpiece, a width of the space-keeping part is less than a maximum width of the machining part, and a thickness of the space-keeping part is less than a maximum machining width of the machining part.

According to the linear saw in the embodiments of the present invention, for example, a maximum machining width of the machining part is equal to a thickness of saw teeth of the machining part or a maximum thickness of path-opened saw teeth of the machining part.

According to the linear saw in the embodiments of the present invention, for example, a difference between a maximum machining width of the machining part and a thickness of the space-keeping part is greater than a bending offset which is produced by the linear saw in a thickness direction of the space-keeping part before the space-keeping part passes through the workpiece.

According to the linear saw in the embodiments of the present invention, for example, the machining part and the space-keeping part are integrally formed or assembled in a linear extension direction of the linear saw.

According to the linear saw in the embodiments of the present invention, for example, a fastening part is disposed on one end or two ends of the linear saw, where a thickness of the fastening part is not greater than a thickness of the machining part, and a width thereof is not greater than a maximum width of the machining part.

According to the linear saw in the embodiments of the present invention, for example, the linear saw includes more than one machining part, and the space-keeping part is disposed between two adjacent machining parts.

According to the linear saw in the embodiments of the present invention, for example, the linear saw includes more than one machining part and more than one space-keeping part, and the multiple machining parts and the multiple space-keeping parts are arranged at intervals.

According to the linear saw in the embodiments of the present invention, for example, the machining part has a saw-teeth structure with paths opened at left and right sides.

According to the linear saw in the embodiments of the present invention, for example, the machining part has an inverted-teeth structure.

According to the linear saw in the embodiments of the present invention, for example, the machining part includes a saw-teeth structure, and the saw-teeth structure has a wide-teeth structure or a teeth structure of varying lengths.

According to the linear saw in the embodiments of the present invention, for example, a width of the space-keeping part is less than a maximum width of the machining part, where a thickness of the space-keeping part is less than a maximum machining width of the machining part and a length of the space-keeping part ranges from 16 mm to 27 mm.

According to the linear saw in the embodiments of the present invention, for example, the length of the space-keeping part ranges from 24 mm to 26 mm.

According to the linear saw in the embodiments of the present invention, for example, the workpiece is a raw plate of a knife template, of which a material is one or more of wood, a PVC material, a bakelite material, an acrylic material, plastic, aluminum, iron, and copper.

Another aspect of the embodiments of the present invention provides a linear saw, which includes: saw teeth and a saw back, where a segment, disposed with the saw teeth, of the linear saw is a machining part. The linear saw further includes a space-keeping part, and the space-keeping part is formed on a section, which is connected to the machining part and is not disposed with the saw teeth, of the saw back, where a length of the space-keeping part is greater than a thickness of a workpiece of the linear saw, and a thickness of at least one segment of the saw back is less than a maximum width of the machining part, or a thickness of a segment, on which the space-keeping part is located, of the saw back is less than a maximum width of the machining part, or a thickness of the space-keeping part is less than a maximum width of the machining part.

According to the linear saw in the embodiments of the present invention, for example, a segment, supporting the machining part, of the saw back of the linear saw has a stepped or semicircle or triangular or trapezoidal transition structure.

Still another aspect of the embodiments of the present invention provides a numerical control machining device, which includes the aforementioned linear saw.

Yet another aspect of the embodiments of the present invention provides a numerical control machining device, which includes a numerical control motor and a linear saw described in any one of claims, where the numerical control motor includes a vibration motor and a moving motor, the vibration motor is used for controlling the linear saw to vibrate in a linear extension direction of the linear saw, and the moving motor is used for controlling the linear saw to make a translation movement in a plane perpendicular to the linear extension direction.

According to the numerical control machining device in the embodiments of the present invention, for example, the numerical control motor further includes a rotation motor, where the rotation motor is used for controlling the linear saw to rotate about a central axis of the linear saw.

According to the numerical control machining device in the embodiments of the present invention, for example, the numerical control machining device further includes a clamping tool head and an elastic tool head, where the clamping tool head is mounted on the side of the vibration motor and is used for clamping and fastening one end of the linear saw, and the elastic tool head is directly or indirectly connected to the other end of the linear saw, where the elastic tool head includes a pressure spring or a pull spring.

Another aspect of the present invention provides a machining method using a linear saw, where a machining part of the linear saw cuts a workpiece, to form a machined slot in the workpiece; and the entire linear saw does not contact the machined slot or is not subjected to an acting force from the machined slot when a space-keeping part of the linear saw passes through the machined slot.

In the machining method using a linear saw according to the embodiments of the present invention, when the machining part cuts the workpiece and the space-keeping part passes through the machined slot, the linear saw moves simultaneously in a linear extension direction of the linear saw and in a machining direction of the machined slot.

In a linear saw according to the embodiments of the present invention, because a space-keeping structure is disposed, the linear saw has time and space to recover from deformation produced by cutting a workpiece, thereby efficiently preventing an accumulated error and greatly improving position precision of a machined gap.

BRIEF DESCRIPTION OF THE DRAWINGS

To describe the technical solutions in the embodiments of the present invention more clearly, the accompanying drawings of the embodiments are briefly described below. Apparently, the accompanying drawings described below merely cover some embodiments of the present invention and do not limit the present invention.

FIG. 3a is a front view of the linear saw and FIG. 3b is a side view of the linear saw;

FIG. 4a, FIG. 4b and FIG. 4c show a structure of a linear saw according to an embodiment of the present invention, where FIG. 4a is a front view of the linear saw, FIG. 4b is one side view of the linear saw, and FIG. 4c is the other side view of the linear saw;

FIG. 5a, FIG. 5b, and FIG. 5c show another structure of a linear saw according to an embodiment of the present invention, where FIG. 5a is a front view of the linear saw, FIG. 5b is one side view of the linear saw, and FIG. 5c is the other side view of the linear saw;

FIG. 6a, FIG. 6b, and FIG. 6c show still another structure of a linear saw according to an embodiment of the present invention, where FIG. 6a is a front view of the linear saw, FIG. 6b is one side view of the linear saw, and FIG. 6c is the other side view of the linear saw;

FIG. 7a, FIG. 7b, FIG. 7c, and FIG. 7d show yet another structure of a linear saw according to an embodiment of the present invention, where FIG. 7a is a front view of the linear saw, FIG. 7b is one side view of the linear saw, FIG. 7c is the other side view of the linear saw, and FIG. 7d is a perspective amplified top view of the linear saw;

FIG. 8a, FIG. 8b, FIG. 8c, and FIG. 8d show still another structure of a linear saw according to an embodiment of the present invention, where FIG. 8a is a front view of the linear saw, FIG. 8b is one side view of the linear saw, FIG. 8c is the other side view of the linear saw, and FIG. 8d is a perspective amplified top view of the linear saw;

FIG. 9a, FIG. 9b, FIG. 9c, and FIG. 9d show still another structure of a linear saw according to an embodiment of the present invention, where FIG. 9a is a front view of the linear saw, FIG. 9b is one side view of the linear saw, FIG. 9c is the other side view of the linear saw, and FIG. 9d is a perspective amplified top view of the linear saw;

FIG. 10a, FIG. 10b, and FIG. 10c show still another structure of a linear saw according to an embodiment of the present invention, where FIG. 10a is a front view of the linear saw, FIG. 10b is one side view of the linear saw, and FIG. 10c is the other side view of the linear saw;

FIG. 11a, FIG. 11b, and FIG. 11c show still another structure of a linear saw according to an embodiment of the present invention, where FIG. 11a is a front view of the linear saw, FIG. 11b is one side view of the linear saw, and FIG. 11c is the other side view of the linear saw;

FIG. 12a, FIG. 12b, and FIG. 12c show still another structure of a linear saw according to an embodiment of the present invention, where FIG. 12a is a front view of the linear saw, FIG. 12b is one side view of the linear saw, and FIG. 12c is the other side view of the linear saw;

FIG. 13a and FIG. 13b schematically show a machining process using a linear saw according to an embodiment of the present invention.

NUMERALS IN THE ACCOMPANYING DRAWINGS

Figure 1:
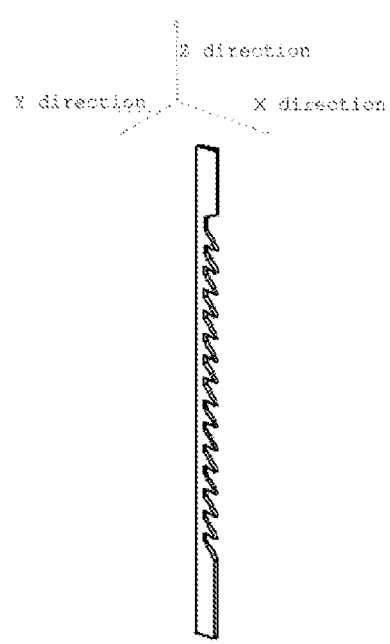
FIG. 1 is a three-dimensional view of a linear saw according to prior arts.

I cutting portion
II supporting portion
1, 1A, 1B machining part
2, 2A, 2B space-keeping part
3 fastening part
701 motor
702 tool head
800 workpiece

DETAILED DESCRIPTION

To make the objective, technical solutions, and advantages of the present invention clearer, the technical solutions of the embodiments of the present invention are clearly and completely described below with reference to the accompanying drawings of the embodiments of the present invention. Apparently, the described embodiments are some rather than all of the embodiments of the present invention. Based on the described embodiments of the present invention, other embodiments acquired by persons of ordinary skill in the art without creative effort all belong to a protection scope of the present invention.

Unless defined otherwise, the technical terms or scientific terms used herein should have ordinary meanings construed by those of ordinary skill in the art to which the present invention belongs. The "first", "second" and similar words used in the patent specification and claims of the present invention do not denote any order, quantity or importance, but are merely intended to distinguish between different constituents. Similarly, similar words such as "one" do not represent a quantity limit, but indicate that there is at least one.

As described in the background, during reciprocation of a traditional linear saw, accumulated deformation (error) is produced. Therefore, on one hand, high-precision straight machining cannot be achieved; and on the other hand, aging of the linear saw itself speeds up and even a saw blade is damaged and broken. Based on the foregoing analysis, a restoring force is produced as the saw bends and deforms, and enables the saw to restore to a flat status before bending. However, the restoring force cannot function due to a clamping function of the workpiece, so the saw cannot timely recover from the deformation and accumulated deformation is produced accordingly.

Figures 2A, 2B, 2C:
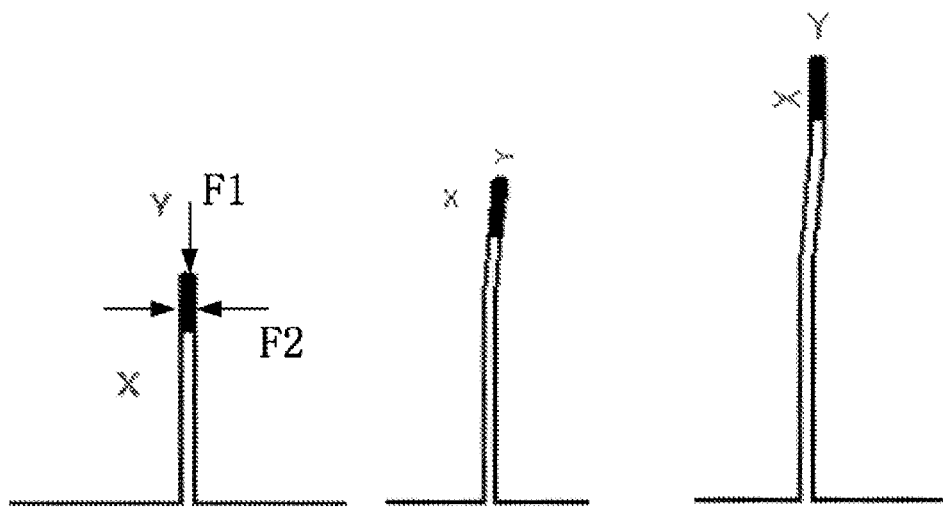
FIG. 2a to FIG. 2e are views showing phased effects of machining a wooden board with a linear saw according to prior arts.
Figures 2D, 2E:
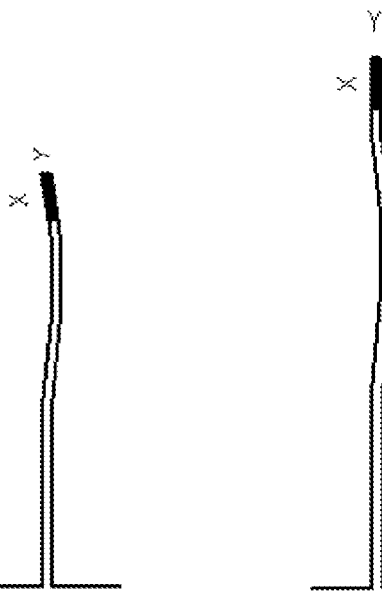

The clamping function of the workpiece generally includes a sandwiching force (a Y-axis direction) from two inner walls of a formed gap and a reactive force from the workpiece in a forward direction (an X-axis direction) of the linear saw. The reactive force is opposite to the forward direction of the saw. An inner wall of a top of the formed gap (a machined slot) presses against the saw and acts a force on the saw, and the saw is unable to restore to the flat status in the Y-axis direction due to a friction produced by the force on the saw. In FIG. 2a, F2 is used to indicate the sandwiching force in the Y-axis direction and F1 is used to indicate the reactive force in the X-axis direction.

According to technical solutions of the present invention, by changing a structure of the traditional linear saw, specifically, by disposing a space-keeping structure, the saw is not subjected to the aforementioned acting force from the workpiece in a certain time and space, and therefore returns to a straight-line machining position of the saw under the effect of a deformation restoring force. In this way, although a deformation error is still produced during machining, the aforementioned accumulated error can be eliminated.

Figures 3A, 3B:
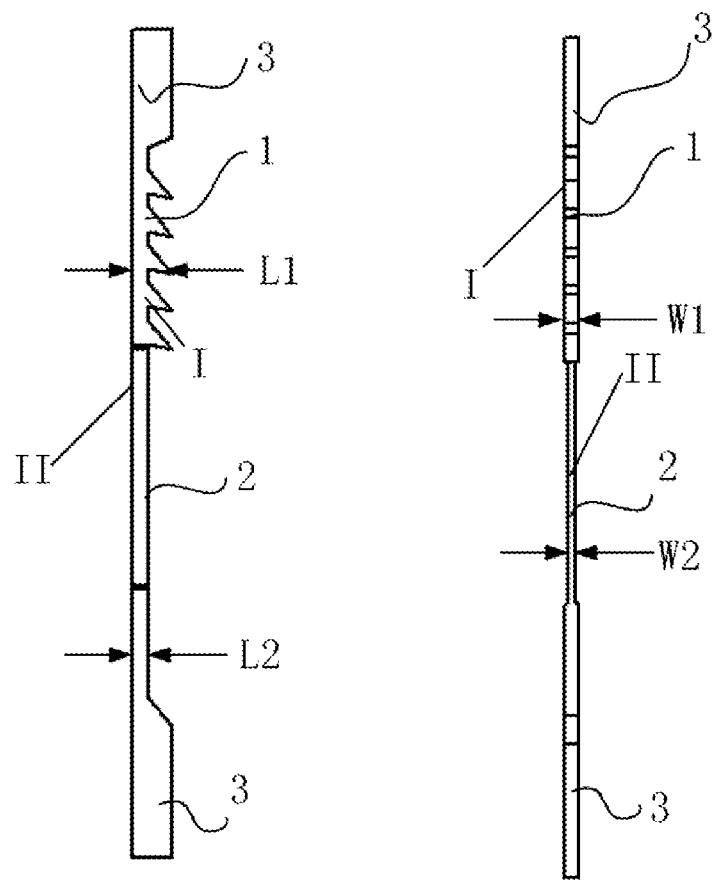
FIG. 3a and FIG. 3b are schematic views of a basic structure of a linear saw according to an embodiment of the present invention, where

FIG. 3a and FIG. 3b are schematic views of a basic structure of a linear saw according to an embodiment of the present invention, where FIG. 3a is a front view of the linear saw and FIG. 3b is a side view of the linear saw. FIG. 3a and FIG. 3b reflect two manners for structure classification. One classification manner is from the perspective of an outward effect of the linear saw, where the linear saw includes a cutting portion I and a supporting portion II; and the other classification manner is from the perspective of an inward effect of the linear saw, where the linear saw includes a machining part 1, a space-keeping part 2, and a fastening part 3. From the perspective of space, it may be considered that, the first classification manner is from the perspective of a width direction (corresponding to the X-axis direction in FIG. 1) in FIG. 3a, and the second classification manner is from the perspective of a length direction (an extension direction of the linear saw, corresponding to the Z-axis direction in FIG. 1) in FIG. 3a and FIG. 3b.

Referring to FIG. 3a, if the structure is described in the first manner, the linear saw includes: a cutting portion I for cutting and machining a workpiece, for example, saw teeth; and a supporting portion II for supporting the cutting portion I, for example, a saw back.

The linear saw described in the embodiment of the present invention may have a saw blade of a certain length in a saw-teeth arrangement direction. A "linear direction of the linear saw" or a "linear extension direction of the linear saw" or a "Z-axis direction" is identical with or parallel with an arrangement direction of the saw teeth in the cutting portion I. Because the saw blade has a certain length and a thin machining surface, the supporting portion II can support the saw blade and enhance strength of the linear saw, and further can facilitate assembly and disassembly of the saw blade.

Alternatively, for example, a strip-shaped rigid material plate is made into the cutting portion I along one long side thereof, and the other long side is made into the supporting portion II. The supporting portion II may be merely the rigid material plate itself or may also be further machined. For example, the supporting portion II is further polished and burnt, and a shape, structure, and thickness thereof may all be identical with or different from the cutting portion I.

For example, the supporting portion II may be formed by multiple sections of different shapes and thicknesses, that is, differs in the shape and thickness in different positions. For example, another material may be mounted on the supporting portion II of the rigid material to strengthen and support the linear saw.

For example, the cutting portion I and the supporting portion II may be integrally formed or may also be assembled. The cutting portion I and the individually made supporting portion II may be directly assembled and connected, to form the linear saw.

If the structure is described in the second manner, the linear saw according to the embodiment of the present invention includes a machining part 1, a space-keeping part 2, and a fastening part 3.

The machining part 1, the space-keeping part 2, and the fastening part 3 are integrally formed or assembled.

As shown in FIG. 3a, the machining part 1 is a segment, disposed with saw teeth, of the linear saw; and includes a cutting portion I and a corresponding segment, integrated with or connected to the cutting portion I, of the supporting portion II. A direction of the saw teeth of the cutting portion I is schematically shown.

The space-keeping part 2 is disposed between the machining part 1 and the fastening part 3, and is integrated with or assembled to the machining part 1 and/or the fastening part 3. The space-keeping part 2 passes through a machined slot in a process where the linear saw machines the workpiece, but is not subjected to an acting force from inner walls of the machined gap when passing through the machined slot. That is to say, in a process where the space-keeping part 2 passes through the workpiece, the space-keeping part 2 is not sandwiched between inner walls of two sides of the machined slot, and also does not press against an inner wall of a top side of the machined slot; therefore, the workpiece does not act a force on the linear saw. In this way, as analyzed above, the linear saw (including the machining part 1) restores to a straight-line machining position under the effect of a deformation restoring force of the linear saw, thereby eliminating an accumulated error during machining.

According to the embodiment of the present invention, a length of the space-keeping part 2 is greater than a thickness (a machining distance in a Z-axis direction) of the workpiece, a width is less than a maximum width (an X-axis direction) of the machining part 1, and a thickness is less than a width (a machining distance in a Y-axis direction) of the machined slot. In this way, when the space-keeping part 2 passes through the workpiece, it may be ensured within a time period that the space-keeping part 2 is not sandwiched between inner walls of two sides of the machined slot and also does not press against the inner wall of the top side of the machined slot; therefore, the workpiece does not act a force on the linear saw within this time period. A length of the time period depends on a difference between the length of the space-keeping part 2 and the thickness of the workpiece, and on a movement angle and speed of the linear saw in the Z-axis direction.

Specifically, as shown in FIG. 3a, a width L2 of the space-keeping part 2 is less than a maximum width L1 (corresponding to a distance in the X-axis direction in FIG. 1) of the machining part 1, where the maximum width of the machining part 1 is actually a sum of a maximum extension length of the saw teeth in the X-axis direction and a width of the saw back. If the width of the space-keeping part 2 is less than the maximum width of the machining part 1, after the machining part 1 cuts and machines the workpiece and moves in the X-axis direction, the space-keeping part 2 may continuously move at a certain distance (for example, the distance L=L1-L2) in the X-axis direction. While the space-keeping part 2 moves, the space-keeping part 2 does not contact the workpiece in the X-axis direction, and therefore is not subjected to an acting force in the X-axis direction.

As shown in FIG. 3b, a thickness W2 of the space-keeping part 2 is less than the width (a machining distance in the Y-axis direction) of the machined slot. The width (a machining distance in the Y-axis direction) of the machined slot depends on a machining width of the machining part 1. That is to say, the width of the machined slot is equal to or is slightly greater than a maximum machining width of the machining part 1. When the machining part 1 refers to saw teeth arranged in a straight line in an extension direction (the Z-axis direction), the width of the machined slot is equal to or is slightly greater than a thickness (the Y-axis direction) W1 of the saw teeth.

After the machining part 1 cuts and machines the workpiece and moves in the X-axis direction, the space-keeping part 2 may continuously move at a certain distance (for example, the distance L=L1-L2) in the X-axis direction, and simultaneously moves in the Z-axis direction and passes through the machined slot. Because the thickness of the space-keeping part 2 is less than the width of the machined slot, while moving, the space-keeping part 2 is not sandwiched between inner walls of two sides of the machined slot in the Y-axis direction, and therefore, the space-keeping part 2 is not subjected to, both in the X-axis direction and the Y-axis direction, an acting force from the workpiece and restricting restoration of the space-keeping part.

As described above, within a machining period, after the machining part 1 cuts and machines the workpiece, the entire linear saw (including the machining part 1 and the space-keeping part 2) bends and deforms. As a result, even if the thickness of the space-keeping part 2 is less than the width of the machined slot, a side of the space-keeping part 2 probably contacts an inner wall of a corresponding side of the machined slot, but a force acting by the inner wall of this side on the space-keeping part 2 is in a direction opposite to that of deformation and does not hinder the linear saw from recovering from the deformation. For example, the thickness of the space-keeping part 2 is set so that a difference between the maximum machining width of the machining part 1 and the thickness is greater than a deformation offset of the space-keeping part 2 in the Y-axis direction. In this way, the space-keeping part 2 does not contact the inner walls of the machined slot when passing through the machined slot. Accordingly, when the space-keeping part 2 passes through the workpiece, the space-keeping part 2 completely does not contact the workpiece, and then the linear saw is completely separated from the workpiece, so that the linear saw can recover from the deformation.

In the embodiment shown in FIG. 3a and FIG. 3b, the supporting portion II without the cutting portion I may be used as the space-keeping part 2. For example, the saw teeth are removed or are not disposed, so as to decrease the width in the X-axis direction. Because the cutting portion I and the supporting portion II are the same in thickness in the Y-axis direction, a whole or a segment of the supporting portion II without the cutting portion I may be thinned to implement thickness decrease in the Y-axis direction.

The space-keeping part 2 may also be disposed with saw teeth, yet a maximum length of these saw teeth in the X-axis direction is less than a maximum length of saw teeth of the cutting portion I in the X-axis direction, or a maximum length of a whole of these saw teeth and a supporting portion II corresponding to these saw teeth in the X-axis direction is less than a maximum length of a whole of the cutting portion I and the supporting portion II corresponding to the cutting portion I in the X-axis direction. In consideration of time used by the linear saw to recover from the deformation and a speed at which the space-keeping part 2 moves in the X-axis direction, if the space-keeping part 2 is required to move at a certain distance in the X-axis direction without contacting the workpiece, using the supporting portion II without the cutting portion I as the space-keeping part 2 is a solution that is easily implemented.

For example, the maximum machining width of the machining part 1 is increased by using a structure such as path-opened saw teeth; in this way, it is unnecessary to thin the supporting portion II without the cutting portion I to implement the space-keeping part 2, and the thickness of the space-keeping part 2 is also less than the maximum machining width of the machining part 1.

In the foregoing thinning solution, the thickness of the supporting portion II without the cutting portion I is decreased to implement the space-keeping part 2. A thickness of a segment or a whole of the supporting portion II without the cutting portion I is decreased, as long as a length of a segment (the space-keeping part 2) decreased in thickness is greater than the thickness of the workpiece. Similarly, the thickness of the space-keeping part 2 is set by thinning, so that a difference between the maximum machining width of the machining part 1 and the set thickness is greater than a deformation offset of the space-keeping part 2 in the Y-axis direction; and in this way, the space-keeping part 2 does not contact the inner walls of the machined slot when passing through the machined slot.

For example, the whole supporting portion II is thinned or a supporting portion II of a thickness less than that of the cutting portion I is used, which can facilitate implementation of the space-keeping part 2. To ensure the rigidity of the entire linear saw, the space-keeping part 2 still needs to have a certain thickness.

In the solution shown in FIG. 3a and FIG. 3b, a thickness of a segment, of a continuous length, of the supporting portion II without the cutting portion I is less than a maximum machining width (equal to the maximum machining width of the machining part 1) of the cutting portion I, and this segment of the supporting portion II is used as the space-keeping part 2. For example, by machining, a thickness of a whole, of a continuous length, of the supporting portion II without the cutting portion I is made to be less than the maximum machining width of the cutting portion I, and this segment of the supporting portion II is used as the space-keeping part 2, which can enhance length utilization of the linear saw, so that a shorter linear saw can be implemented for a workpiece of a fixed thickness.

For example, the length of the machining part 1 and that of the space-keeping part 2 can be adjusted according to the thickness of the workpiece. Such adjustment may be designing linear saws (including machining parts 1 and space-keeping parts 2 of different lengths) of different sizes, or may also be designing a linear saw with a changeable space-keeping part 2. As described above, the length of the space-keeping part 2 is greater than the thickness of the workpiece. For example, the length of the machining part 1 may also be greater than the thickness of the workpiece, and in this way, a cutting output of the machining part 1 on the workpiece may be increased. Considering that the rigidity of the linear saw probably decreases if the entire linear saw is lengthened, the length of the machining part 1 and that of the space-keeping part 2 needs to be set on the whole.

The fastening part 3 is disposed on an end of the linear saw, and is used for clamping and fastening the linear saw from the outside. In the solution shown in FIG. 3a and FIG. 3b, two ends of the linear saw are both disposed with the fastening parts 3, to achieve fastening at the two ends. For example, the fastening part 3 may also be only disposed on one end to achieve fastening at one end. Alternatively, the machining part 1 and/or the space-keeping part 2 of the linear saw may also be directly clamped, and therefore it is not required to dispose the fastening part 3. As shown in FIG. 3a and FIG. 3b, the fastening part 3 may be a remaining segment of the original strip-shaped material after the machining part 1 and the space-keeping part 2 are formed, so a width of the fastening part in the X-axis direction may be substantially equal to a width of the machining part 1 in the X-axis direction (FIG. 3a) and a thickness thereof in the Y-axis direction may be substantially equal to the thickness of the machining part 1 in the Y-axis direction (FIG. 3b). In this way, a machining process is not only simplified (it is not required to separately machine the fastening part 3), but also the fastening part 3 has a certain width and thickness to facilitate clamping and enhance rigidity. Optionally, the fastening part 3 may also be of another shape, for example, a hook shape, for fastening a pull spring or a pull rod. In addition, the thickness and the width of the fastening part 3 generally do not exceed the thickness and the width of the machining part 1 respectively, and in this way, the fastening part 3 can easily move into or out of the machined gap together with the machining part 1.

The linear saw may be automatically or manually driven to move in a linear extension direction of the tool, and make a translation movement in a plane perpendicular to the linear extension direction of the tool. The movement in the linear extension direction of the tool includes a one-way movement towards one direction and a two-way reciprocation movement. The linear saw may be located in any position of a three-dimensional space. No matter which position it is located in, the linear extension direction of the linear machining tool refers to a length direction in which the saw teeth are arranged. For example, when the linear saw is used to machine a horizontally placed workpiece, a flat board, a saw-teeth arrangement direction of the linear saw is made to be perpendicular to the horizontal plane, that is, perpendicular to the workpiece board. Then, a movement of the linear saw includes: a movement in a linear extension direction of the tool, that is, an upward or a downward (corresponding to the foregoing Z-axis direction) longitudinal movement perpendicular to the horizontal plane; and a translation movement in a plane perpendicular to the linear extension direction, for example, a movement towards the X axis and/or the Y axis direction. If the linear saw is placed at a certain angle with respect to the horizontal plane, the linear extension direction of the tool still refers to the saw-teeth arrangement direction of the linear saw, and a certain angle is also formed between this direction and the horizontal plane at this time; and a certain angle is also formed between the plane perpendicular to the linear extension direction and the horizontal plane.

According to the embodiment of the present invention, when the machining part 1 of the linear saw acts on the workpiece, the linear saw moves in an extension direction thereof and simultaneously makes a translation movement in the plane perpendicular to the extension direction. When the space-keeping part 2 passes through the workpiece, the linear saw moves in an extension direction thereof and simultaneously makes a translation movement in the plane perpendicular to the extension direction.

As shown in FIG. 3a and FIG. 3b, the linear saw in the embodiment of the present invention includes one machining part 1 and one space-keeping part 2. Seen from a saw-teeth direction, that is, seen from a direction of cutting a workpiece, the machining part 1 is located above the space-keeping part 2, and the two do not intersect. For example, according to another embodiment of the present invention, the space-keeping part 2 may be located above the machining part 1, as shown in FIG. 4a and FIG. 4b.

For example, the linear saw according to the embodiment of the present invention may further include one or more machining parts 1, and one or more space-keeping parts 2. For example, the machining parts 1 and the space-keeping parts 2 may be arranged alternatively. For example, the machining parts 1 and the space-keeping parts 2 may be arranged in pairs. For example, the number of the space-keeping parts 2 may be less than, equal to, or greater than that of the machining parts 1. For example, the linear saw may include two machining parts 1 and one space-keeping part 2 (as shown in FIG. 5a, FIG. 5b, and FIG. 5c), or the linear saw may include one machining part 1 and two space-keeping parts 2 (as shown in FIG. 6a, FIG. 6b, and FIG. 6c), or the linear saw may include two sections of machining parts 1 and two sections of space-keeping parts 2, or the like. In this way, for a workpiece of different strength and a different thickness, a linear saw of a different structure may be selected, or a linear saw of a different structure may also be selected according to different machining precision.

If the linear saw has multiple space-keeping parts 2, a length of each space-keeping part 2 is greater than a thickness of the workpiece, a width thereof is less than a width of the machining part 1, and a thickness thereof is less than a maximum machining width of the machining part 1.

For the linear saw of several structures, a movement track thereof and a process of machining a workpiece are described below.

As described above, FIG. 4a, FIG. 4b, and FIG. 4c show a structure of a linear saw according to an embodiment of the present invention. Referring to FIG. 4a, FIG. 4b, and FIG. 4c, the linear saw includes a machining part 1 and a space-keeping part 2, and the space-keeping part 2 is disposed above the machining part 1.

An example in which the linear saw is perpendicular to a machining surface of a horizontally placed workpiece is used. The machining part 1 first passes through the machining surface of the workpiece, and then the space-keeping part 2 passes through the machining surface of the workpiece. The bottom of the linear saw is placed at an initial position on an upper surface of an edge of the workpiece, and after the initial position of the linear saw is determined, the linear saw moves downwards in a linear direction of a saw blade and simultaneously makes a translation movement in a forward direction. During machining, the linear saw is subjected to an obstruction in the forward direction, an obstruction in a linear direction of the saw blade, and a friction that is produced due to a clamping force and a force counterbalancing to the obstruction, and as a result, the saw blade bends and deforms. The deformation of the saw blade results in deviation in a machining position or a machining direction of the saw blade, and a position of the saw blade and a to-be-machined straight gap are not on a same line. When a terminal of the machining part 1 leaves the workpiece, the space-keeping part 2 of the linear saw passes through the workpiece. At this time, the linear saw still moves in the linear direction and simultaneously moves in the forward direction. Because a thickness of the entire supporting portion II or a thickness of at least the supporting portion II disposed at the space-keeping part 2 is less than a thickness (equal to a maximum machining width of the machining part 1) of the cutting portion I, when the space-keeping part 2 passes through the workpiece, the linear saw is not clamped in the formed gap and the linear saw can recover from the deformation accordingly. Due to a rigid restoring force of the saw blade and/or a pull effect of two ends of the linear saw, the linear saw rapidly restores to a straight-line machining position, and operates from the original straight-line position, thereby correcting the deviation and eliminating an accumulated error.

When the space-keeping part 2 passes through the workpiece, because a width difference (similar to L1-L2 previously described in FIG. 3a) between the machining part 1 and the space-keeping part 2 is optionally equal to a length $X_{ST}$ of the saw teeth, when the space-keeping part 2 passes through the machined gap, a distance at which the space-keeping part 2 advances in a forward direction (an X-axis direction) is usually less than the length $X_{ST}$ of the saw teeth, or at most reaches a distance equal to the length of the saw teeth. In this way, the space-keeping part 2 is made not to contact the workpiece in the forward direction. In order to meet this condition, usually, in a time period during which the space-keeping part 2 passes through the workpiece, the following equation is satisfied: $Z_2/V_{2Z} \leq X_{ST}/V_{2X}$, where $Z_2$ is the length (Z-axis direction) of the space-keeping part, $X_{ST}$ is the length (X-axis direction) of the saw teeth, $V_{2X}$ and $V_{2Z}$ are speeds or average speeds, at which the space-keeping part 2 passes through the workpiece, in the X-axis direction and in the Z-axis direction respectively.

When the space-keeping part 2 completely passes through the machined gap, or when the linear saw stops moving or changing a track, the linear saw completes a current cutting operation on the workpiece.

As described above, for example, the difference between the thickness of the space-keeping part 2 and the maximum machining width of the machining part 1 is greater than an offset produced by the saw blade before the space-keeping part 2 passes through the workpiece. As a result, when the space-keeping part 2 passes through the workpiece, neither the cutting portion I nor the supporting portion II of the entire linear saw contact the workpiece, and the linear saw is not clamped in the formed gap.

Further, for example, the linear saw merely makes a one-way movement in a linear extension direction and does not continuously advance in a forward direction. Then, the linear saw is driven by a motor, or by restoration equipment in a numerical control machining device, or by hands to an initial position of a second machining period; and a first machining period ends at this time. For example, the linear saw still restores to a position on an upper surface of a machined board, to conduct second-period machining. The rest can be done in the same manner, to machine the workpiece.

For example, a cutting efficiency is higher if a reciprocating cutting manner is used. At this time, the linear saw reciprocates in a linear extension direction. The cutting described above is actually a semi-period operation, that is, a first semi-period operation; then, the linear saw performs a second semi-period operation. The linear saw moves upwards (corresponding to a direction opposite to a cutting direction in the first semi-period) in a linear direction, and the space-keeping part 2 first passes through the workpiece.

During this time period, if the space-keeping part 2 horizontally advances in the first semi-period at a distance that is less than or equal to the length of the saw teeth, in the second machining semi-period, the space-keeping part 2 may move merely in a linear direction of the linear saw, but does not move in a forward direction. The reason is that the space-keeping part 2 moves merely in the linear direction of the linear saw in the second semi-period if the space-keeping part 2 advances in the first semi-period at a distance equal to the length of the saw teeth and does not make a translation movement in the forward direction; otherwise, the space-keeping part 2 has no space to advance.

Alternatively, in the second semi-period, the space-keeping part 2 moves in the linear direction of the linear saw and simultaneously makes a translation movement in the forward direction. A sum of an advancing distance in the second semi-period and an advancing distance in the first semi-period still needs to be less than or equal to the length of the saw teeth. Such a successive movement mode in the forward direction facilitates a control over the linear saw.

The machining part 1 passes through the workpiece after the space-keeping part 2 passes through the workpiece, and cuts the workpiece again. The second semi-period ends.

In a next period (a second machining period), firstly, the machining part cuts the workpiece; and therefore, a maximum accumulated error that can be actually eliminated by the space-keeping part 2 is an error amount produced after twice of cutting.

In the following machining periods, the linear saw continues to make a translation movement in a forward direction and move in a linear direction. The rest can be done in the same manner, to machine the workpiece.

If the linear saw has more than one machining parts 1 and more than one space-keeping parts 2, the machining parts 1 and the space-keeping parts 2 successively and sequentially pass through a machining surface of the workpiece. When the machining part 1 passes through the machining surface, the machining part 1 contacts the workpiece to cut the workpiece. When the space-keeping part 2 passes through the machining surface, the space-keeping part 2 is not clamped in the workpiece and the linear saw recovers from the deformation.

FIG. 5*a*, FIG. 5*b*, and FIG. 5*c* show another structure of a linear saw according to an embodiment of the present invention. Referring to FIG. 5*a*, FIG. 5*b*, and FIG. 5*c*, the linear saw includes two machining parts: a machining part 1A and a machining part 1B; and one space-keeping part 2, where the space-keeping part 2 is disposed between the two machining parts 1A and 1B.

An example in which the linear saw is perpendicular to a machining surface of a horizontally placed workpiece and machines the workpiece is used. The machining part 1A first passes through the machining surface of the workpiece, and then the space-keeping part 2 passes through the machining surface of the workpiece, and afterwards, the machining part 1B passes through the machining surface of the workpiece.

The bottom of the linear saw is placed at an initial machining position on an upper surface of an edge of the workpiece, to conduct first-period machining. After the initial position of the linear saw is determined, the linear saw longitudinally moves downwards in a linear direction, and simultaneously makes a translation movement in a forward direction in a machining surface, perpendicular to a tool linear direction, of the workpiece. That is, the machining part 1A of the linear saw first makes a translation movement in a forward direction and also longitudinally moves downwards in a linear direction. In a process where the machining part 1A cuts the workpiece, the linear saw is subjected to an obstruction in the forward direction, an obstruction in an extension direction of a saw blade, and a friction; and as a result, the saw blade bends and deforms. The deformation of the saw blade results in deviation in a machining position or a machining direction of the saw blade, and a position of the saw blade and a to-be-machined straight gap are not on a same line. When a terminal of the machining part 1A leaves the workpiece, the space-keeping part 2 of the linear saw passes through the workpiece. At this time, the linear saw still moves in the linear direction and simultaneously moves in the forward direction. Because a thickness of the entire supporting portion II or a thickness of at least the supporting portion II disposed at the space-keeping part 2 is less than a thickness of the cutting portion I, when the space-keeping part 2 passes through the workpiece, the linear saw is not clamped in the formed gap and the linear saw can recover from the deformation accordingly. Due to a rigid restoring force of the saw blade and/or a pull effect of two ends of the linear saw, the linear saw rapidly restores to a straight-line machining position, and operates still according to an original straight-line position, thereby correcting the deviation and eliminating an accumulated error.

As described above, when the space-keeping part 2 passes through the workpiece, the space-keeping part 2 advances in the X-axis direction at a distance that is usually less than or at most equal to a length of saw teeth of the machining part 1A.

Afterwards, the machining part 1B passes through the workpiece and cuts the workpiece. The linear saw continues to longitudinally move downwards in a linear direction and simultaneously make a translation movement in a forward direction. In a process where the machining part 1B machines a wooden board, the linear saw is still subjected to an obstruction in the forward direction, an obstruction in an extension direction of the saw blade, and a friction; and as a result, the saw blade probably bends and deforms. The deformation of the saw blade probably results in deviation in a machining position or a machining direction of the saw blade, and a position of the saw blade and a to-be-machined straight gap are not on a same line.

For example, when a terminal of the machining part 1B leaves the workpiece, an operation speed or an operation track of the linear saw may be controlled, to make the linear saw slow down or stop moving.

Next, for example, the linear saw makes a one-way movement merely in a linear extension direction thereof. The linear saw may be driven by a motor, driven by a restoration mechanism configured on a numerical control device, or controlled by hands, to make the linear saw reach an initial position of a second machining period, and the first machining period ends at this time. After the second machining period ends, driven by the motor or moved by hands, the linear saw reaches an initial position of a next period and conducts third-period machining. The rest can be done in the same manner, to machine the workpiece.

For example, the linear saw reciprocates upwards and downwards. Then, the cutting described above is actually a semi-period operation, that is, a first semi-period operation; afterwards, the linear saw performs a second semi-period operation. The machining part 1B, the space-keeping part 2, and the machining part 1A of the linear saw successively pass through a machined gap. In the second semi-period, the linear saw longitudinally moves upwards in a linear direction and makes a translation movement in a machining plane perpendicular to the linear direction. The machining part 1B first passes through the workpiece and cuts the workpiece, and then the space-keeping part 2 of the linear saw passes through the workpiece. When the space-keeping part 2 passes through the workpiece, an error produced during machining by the linear saw can be corrected and recovered, and an error amount eliminated at this time is an error amount produced after twice of cutting. Finally, the machining part 1A passes through the workpiece and cuts the workpiece, and the first machining period ends.

In a next period (a second machining period), firstly, the machining part cuts the workpiece; and therefore, a maximum accumulated error that can be actually eliminated by the space-keeping part 2 is an error amount produced after twice of cutting.

In the second machining period, the linear saw continues to move forward and downwards. The rest can be done in the same manner, to machine the workpiece Compared with the linear saw structure shown in FIG. 4a, FIG. 4b, and FIG. 4c, the linear saw structure shown in FIG. 5a, FIG. 5b, and FIG. 5c is additionally disposed with one machining part, which can increase a cutting output.

FIG. 6a, FIG. 6b, and FIG. 6c show still another structure of a linear saw according to an embodiment of the present invention. Referring to FIG. 6, the linear saw includes two space-keeping parts: a space-keeping part 2A and a space-keeping part 2B; and one machining part 1, where the machining part 1 is disposed between the space-keeping part 2A and the space-keeping part 2B.

An example in which the linear saw is perpendicular to a machining surface of the horizontally placed workpiece and machines the workpiece is used. The space-keeping part 2A first passes through the machining surface of the workpiece, and then the machining part 1 passes through the machining surface of the workpiece, and afterwards, the space-keeping part 2B passes through the machining surface of the workpiece. Because the space-keeping part 2A does not cut the workpiece, a through hole may be disposed at an initial machining position of the workpiece to make the space-keeping part 2A pass through the workpiece.

Alternatively, a lower end of the machining part 1 is directly placed at an initial machining position of the workpiece, the machining part 1 first passes through the machining surface of the workpiece, and then the space-keeping part 2B passes through the machining surface of the workpiece.

The linear saw is placed at an initial machining position of the workpiece to conduct first-period machining. After machining begins, the linear saw makes a translation movement in a forward direction and longitudinally moves downwards in a linear direction. For example, according to the foregoing solution in which the lower end of the machining part 1 is placed at an initial machining position of the workpiece, the machining part 1 of the linear saw makes a translation movement in a forward direction and longitudinally moves downwards in a linear direction. In a process where the machining part 1 cuts the workpiece, the linear saw is subjected to an obstruction in the forward direction, an obstruction in an extension direction of the saw blade, and a friction; and as a result, the saw blade bends and deforms. The deformation of the saw blade probably results in deviation in a machining position or a machining direction of the saw blade, and a position of the saw blade and a to-be-machined straight gap are not on a same line. When an upper end of the machining part 1 leaves the workpiece, the space-keeping part 2B of the linear saw passes through the workpiece. At this time, the linear saw still moves in the linear direction and simultaneously moves horizontally in the forward direction. Because a thickness of the entire supporting portion II or a thickness of at least the supporting portion II disposed at the space-keeping part 2B is less than a thickness of the cutting portion I, when the space-keeping part 2B passes through the workpiece, the linear saw is not clamped in the formed gap and the linear saw can recover from the deformation accordingly. Due to a rigid restoring force of the saw blade and/or a pull effect of two ends of the linear saw, the saw blade rapidly restores to a straight-line machining position, and operates from the original straight-line position, thereby correcting the deviation and eliminating an accumulated error.

In a machining mode under reciprocation movement, the space-keeping part 2B successively passes through the machined gap on the workpiece twice. When the space-keeping part passes through the workpiece, a sum of horizontal advancing distances thereof is usually less than or at most equal to the length of saw teeth of the machining part 1.

After the space-keeping part 2B passes through upwards the workpiece again, the machining part 1 of the linear saw passes through the workpiece. The machining part 1 machines the workpiece when passing through the workpiece. Similarly, the linear saw probably still deforms and deviates in a cutting track in the current cutting process, but such an error can be eliminated and corrected subsequently when the space-keeping part 2A passes through the workpiece. After the space-keeping part 2A passes through the workpiece, the first machining period ends.

In a second machining period, the linear saw continues to move forward and downwards, and in a third machining period, the linear saw continues to move forward and downwards again. The rest can be done in the same manner, to machine the workpiece.

In the reciprocating machining mode, within a complete machining period, for the linear saw structure shown in FIG. 4a, FIG. 4b and FIG. 4c and the linear saw structure shown in FIG. 5a, FIG. 5b and FIG. 5c, errors accumulated after the machining part performs cutting twice are eliminated when the space-keeping part passes through the machined gap, while for the linear saw structure shown in FIG. 6a, FIG. 6b and FIG. 6c, because an upper end and a lower end of the machining part are each disposed with the space-keeping part, the error can be timely eliminated after cutting the workpiece each time, which better prevents error accumulation.

During machining, it is required to correctly control an advancing speed of the linear saw in the forward direction, so that the saw blade of the linear saw has enough space-keeping time. That is to say, a speed at which the space-keeping part of the linear saw passes through the workpiece during movement needs to precisely match a displacement speed at which the linear saw advances on the workpiece, so that a duration during which the space-keeping part passes through the workpiece does not exceed a duration required by the linear saw to advance at a distance equal to the length of the saw teeth.

The machining part and the space-keeping part of the linear saw together make a translation movement in a forward direction, and simultaneously make a one-way movement or reciprocate in a linear direction of the saw blade. In this way, when the machining part cuts the workpiece, the space-keeping part passes through the workpiece. In a process where the space-keeping part passes through the workpiece, the linear saw still advances horizontally. If the space-keeping part takes longer time to pass through the workpiece, the linear saw horizontally shifts at a longer distance. If the space-keeping part takes excessively long time to pass through the workpiece, the linear saw advances to an area, that is not cut, of the workpiece, and as a result, the linear saw cannot advance, or the saw blade probably abrades or deviates at an angle, to produce a cutting error. If the space-keeping part takes excessively short time to pass through the workpiece, the linear saw horizontally shifts at a too short distance which is far shorter than the length of the saw teeth, and the machining part begins next machining again. As a result, a large segment of the gap formed by cutting is probably cut again, which leads to excessively low cutting efficiency, and wastes time and resources.

On the other hand, the space-keeping part needs to take enough time to pass through the workpiece so that the entire linear saw completely recovers from the deformation, so as to eliminate an accumulated error.

Therefore, it is required that a duration during which the space-keeping part of the linear saw passes through the workpiece does not exceed a duration required by the linear saw to advance at a distance equal to the length of the saw teeth, but the duration cannot be excessively short and can be appropriately adjusted according to factors such as a material of the workpiece and machining precision, so that a speed at which the space-keeping part of the linear saw passes through the workpiece during movement needs to precisely match a displacement speed at which the linear saw horizontally advances on the workpiece. If a vibration motor is used to control reciprocation of the linear saw in the Z-axis direction, it is required to precisely control a match between a vibration frequency of the vibration motor and a displacement speed of the linear saw controlled by a displacement motor in an X-Y plane.

An embodiment shown in FIG. 7a to FIG. 7d and an embodiment shown in FIG. 8a to FIG. 8d both describe a modification to a supporting portion of a linear saw, and more specifically, a structural modification to a segment (a segment supporting saw teeth), excluding a space-keeping part, of a saw back.

As described above, the supporting portion may be formed by multiple sections of different shapes and thicknesses, that is, has a different shape and thickness at a different position; and a shape, a structure, and a thickness of the supporting portion may all be identical with or different from those of a cutting portion.

The linear saw shown in FIG. 7a to FIG. 7d is similar to the linear saw shown in FIG. 5a to FIG. 5c, and has two machining parts 1A and 1B, one space-keeping part 2, and two fastening parts 3. As shown in FIG. 7d, a thickness W4 of a segment, supporting a machining part (saw teeth), of the saw back is identical with a thickness W2 of the space-keeping part 2 and is less than a thickness W1 of the machining part; and a thickness of a segment, supporting the fastening part 3, of the saw back is also equal to W2, while a thickness W3 of the fastening part 3 is equal to W1. Such a structure in which the thickness of the segment, supporting the machining part, of the saw back is less than the thickness of the machining part may be used in separately machining and assembling the saw back (may include the space-keeping part) and the saw teeth. That is to say, the saw back and the saw teeth are separately machined and then are assembled. In this way, on one hand, the saw back and the saw teeth may be separately manufactured by using different raw materials. For example, a higher-quality and higher-rigidity material with higher abrasion resistance is used to manufacture the saw teeth, and an ordinary material is used to manufacture the saw back, thereby reducing material costs. On the other hand, it is easy to replace the saw teeth serving as consumables.

In addition, a maximum width of the machining part disposed with the saw teeth is equal to a maximum width of the saw teeth, and a maximum machining width of the machining part is equal to a thickness of the saw teeth. Therefore, a maximum machining width of the saw teeth is greater than a thickness of the saw back/space-keeping part, and a maximum width of the machining part is also greater than a width (a sum of widths of the saw back and the saw teeth is greater than a width of the saw back) of the space-keeping part. In this way, upon meeting a requirement on a width and a thickness of the space-keeping part, further machining on the saw back may be saved. That is to say, it is unnecessary to further form a space-keeping part on the saw back.

In addition, as shown by full lines in FIG. 7d, a segment, supporting the saw teeth, of the saw back is of a stepped structure, and its thickness makes a transition from W2, to a thickness W1 of the saw teeth, and then to a thickness W1 of the fastening part 3. Such a transition structure facilitates machining. For example, another transition structure may also be used, such as a semicircle, a triangle, or a trapezoid (as shown in the embodiment in FIG. 8a to FIG. 8d).

For example, the thickness W3 of the fastening part 3 may be less than the thickness W1 of the machining part. If a length of the fastening part 3 is greater than the thickness of the workpiece additionally, the fastening part 3 actually serves as the space-keeping part.

A linear saw embodiment shown in FIG. 9a to FIG. 9d has a saw-teeth structure with paths opened at left and right sides. That is to say, a maximum machining width of the machining part is a maximum thickness W1 of the saw teeth with paths opened at left and right sides.

In addition, as shown by dotted lines in FIG. 9d, a thickness W2 of a space-keeping part 2 is less than a thickness W4 of a segment, supporting the saw teeth, of a saw back. Because the thickness W4 of the segment, supporting the saw teeth, of the saw back is less than a maximum thickness (a maximum machining width) W1 of path-opened saw teeth, the thickness W2 of the space-keeping part 2 may also be equal to the thickness W4 of the segment, supporting the saw teeth, of the saw back, which can reduce machining on the space-keeping part 2. Moreover, if the thickness of the space-keeping part is equal to the thickness, supporting the saw teeth, of the saw back, the maximum machining width of the saw teeth is greater than the thickness of the space-keeping part and the maximum width of the machining part is also greater than the width (a sum of widths of the saw back and the saw teeth is greater than the width of the saw back) of the space-keeping part. Therefore, it is merely required to open paths on the saw teeth to meet a requirement on a width and a thickness of the space-keeping part, and it is unnecessary to further machine the saw back.

FIG. 10a to FIG. 10c show still another structure of a linear saw according to an embodiment of the present invention, where FIG. 10a is a front view of the linear saw, FIG. 10b is one side view of the linear saw, and FIG. 10c is the other side view of the linear saw. Similar to the linear saw in the embodiment shown in FIG. 5a to FIG. 5c, the linear saw shown in FIG. 10a to FIG. 10c has two machining parts 1A and 1B, one space-keeping part 2, and two fastening parts 3. A difference lies in that, as shown in FIG. 10a, a saw-teeth direction of the machining part 1A of the linear saw shown in FIG. 10a to FIG. 10c is opposite to a saw-teeth direction of the machining part 1A of the linear saw shown in FIG. 5a to FIG. 5c. Actually, the saw teeth of the machining part 1A of the linear saw shown in FIG. 10a to FIG. 10c are of an inverted-teeth structure. Residual chippings produced during cutting and machining and left in a machined slot can be removed by using the inverted-teeth structure, thereby saving or alleviating subsequent work of cleaning the workpiece. The inverted-teeth structure may also be arranged in another distribution manner, for example, the same machining part may include both a saw-teeth part for cutting and an inverted-teeth structure.

Multiple modifications may be made to the saw-teeth structure of the machining part of the linear saw in the embodiment of the present invention. In addition to the foregoing path-opened structure and the inverted-teeth structure, a wide-teeth structure shown in FIG. 11a to FIG. 11c or a teeth structure of varying lengths shown in FIG. 12a to FIG. 12c may also be used.

FIG. 13a and FIG. 13b schematically show a machining process using a linear saw according to an embodiment of the present invention. As shown in FIG. 13a, when a machining part 1 cuts a workpiece 800, a machining width W1 is equal to a width of a machined slot. Therefore, the linear saw is clamped in the machined slot and the aforementioned machining error is produced. However, as shown in FIG. 13b, when the space-keeping part 2 passes through the machined slot, the linear saw is not clamped in the machined slot, so that all or at least some of the machining errors can be eliminated.

The linear saw according to the embodiment of the present invention may be used for machining a knife template, and the following table shows, by using examples, linear saw parameters corresponding to different knife template products.

TABLE 1

Table of linear saw parameters corresponding to different knife template products

| | | | | | | | | | | |
|---|---|---|---|---|---|---|---|---|---|---|
| Width of a machined slot (mm) | 0.45 | 0.53 | 0.71 | 1.0 | 1.05 | 1.07 | 1.42 | 2.13 | 2.5 | 2.84 |
| Thickness of a workpiece (mm) | 0.5  1 | 2  3 | 6  8 | 18  20 | 22  24 | 30  35 | 40  50 | | 60 | |
| Maximum width of a machining part of a linear saw (mm) | 0~4.5 | 0~5.3 | 0~7.1 | 0~10 | 0~10.5 | 0~10.7 | 0~14.2 | 0~21.3 | 0~25 | 0~28.4 |
| Length of a space-keeping part of the linear saw (mm) | >0.5  >1 | >2  >3 | >6  >8 | >18  >20 | >22  >24 | >30  >35 | >40  >50 | | >60 | |

As shown in the foregoing table, a combination of two parameters, a width of a machined slot and a thickness of a workpiece, is first used to give an example of a knife template product serving as a machining result, and then saw blade parameters corresponding to workpiece parameter combinations are given, where there is no specific requirement on a width of the linear saw. According to the foregoing embodiments of the present invention, it is required that a width of a space-keeping part is less than a maximum width of a machining part, and as shown in the foregoing table, the maximum width of the machining part is usually not greater than ten times of the width of the machined slot. In addition, according to the foregoing embodiments of the present invention, it is required that a length of the space-keeping part is greater than a thickness of the workpiece (an original plate without being slotted), so data in the fourth line is acquired. Further, the length of the space-keeping part of the linear saw preferably ranges from 16 mm to 27 mm. More preferably, for a frequently used knife template product of a thickness around 18 mm, a length ranging from 24 mm to 26 mm is selected, and such selection can bring better comprehensive machining efficiency and effect.

For example, for other requirements for machining the knife template, there may be other width scopes/values of the machined slot, other thickness scopes/values of the workpiece, or a combination thereof.

The linear saw of the present invention may be used in a hand saw or an electric saw, or may also be driven by a numeric control machining device.

Figure 14:
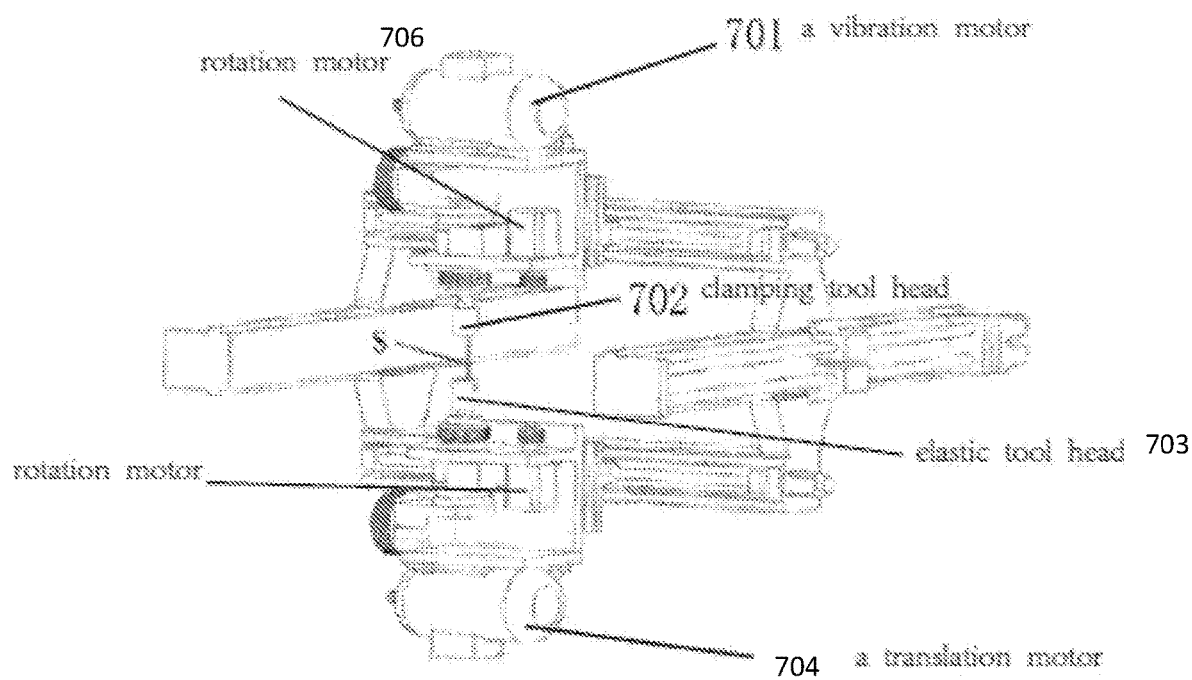
FIG. 14 is a schematic view of a numerical control machining device according to an embodiment of the present invention.

An embodiment of the present invention further provides a numerical control machining device using a linear saw. FIG. 14 is a schematic view of a numerical control machining device. Referring to FIG. 14, the numerical control machining device has multiple motors including a vibration motor 701, a translation motor 704, a rotating motor 706, and the like. The vibration motor 701 is used for controlling the linear saw to move in a linear extension direction; the translation motor 704 is used for controlling the linear saw S to make a translation movement in a direction perpendicular to the linear extension direction, such as along an X axis and/or a Y axis; and the rotating motor 706 can control the linear saw to rotate at different angles about a central axis of a saw blade.

The numerical control machining device may include one or more tool heads 702, used for being connected to or fastened to one end or two ends of the linear saw.

In the embodiment shown in FIG. 14, the numerical control machining device has a set of tool heads, which include one clamping tool head 702 and one elastic tool head 703. One end of the linear saw is clamped and fastened on the clamping tool head 702, and the other end is directly or indirectly connected to the elastic tool head 703. The clamping tool head is mounted on a vibration motor 701, so that the vibration motor 701 drives the linear saw on the clamping tool head to reciprocate. The elastic mechanism is, for example, a pressure spring or a pull spring. An elastic effect of the pull spring or the pressure spring can locate the linear saw, and can further provide a restoration force so that the linear saw recovers from deformation.

The numerical control motor may further adjust a movement position and angle of the tool head according to a numerical control signal, to adjust a machining angle.

If the linear saw according to the embodiments of the present invention is used to machine a knife template, the workpiece is usually a board, and a material of the board may be a solid material such as wood, a PVC material, a bakelite material, an acrylic material, plastic, aluminum, iron, or copper.

In a linear saw according to the embodiments of the present invention, because a space-keeping structure is disposed, the linear saw has time and space to recover from deformation produced after cutting a workpiece, thereby efficiently preventing an accumulated error and greatly improving position precision of a machined gap.

The foregoing content merely describes exemplary implementation manners of the present invention, and does not intend to limit a protection scope of the present invention, and the protection scope of the present invention is determined by attached claims.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A linear saw for cutting a workpiece, comprising:
a machining part, used for cutting the workpiece in a linear extension direction of the linear saw and forming a slot in the workpiece,
wherein,
the linear saw further comprises a space-keeping part, the space-keeping part is disposed so that the space-keeping part of the linear saw does not contact the slot after the machining part leaves the slot,
the space-keeping part is arranged to ensure that the saw blade will not be deformed by a reaction force when the machining part rotates,
a width of the space-keeping part is less than a maximum width of the machining part, and
a thickness of the space-keeping part is less than a maximum machining width of the machining part,
the machining part and the space-keeping part are assembled together; and
the plurality of saw teeth of the machining part are arranged linearly and continuously.

2. The linear saw according to claim 1, wherein
a maximum machining width of the machining part is equal to a thickness of saw teeth of the machining part or a maximum thickness of path-opened saw teeth of the machining part.

3. The linear saw according to claim 1, wherein
a difference between a maximum machining width of the machining part and a thickness of the space-keeping part is greater than an accumulated machining error which is produced by the linear saw in a thickness direction of the space-keeping part before the space-keeping part passes through the workpiece.

4. The linear saw according to claim 1, wherein
the machining part and the space-keeping part are assembled in a linear extension direction of the linear saw.

5. The linear saw according to claim 1, wherein
a fastening part is disposed on one end or two ends of the linear saw, a thickness of the fastening part is not greater than a thickness of the machining part, and a width thereof is not greater than a maximum width of the machining part.

6. The linear saw according to claim 1, wherein
the linear saw comprises more than one machining part, and the space-keeping part is disposed between two adjacent machining parts.

7. The linear saw according to claim 1, wherein
the linear saw comprises more than one machining part and more than one space-keeping part, and the multiple machining parts and the multiple space-keeping parts are arranged alternatively.

8. The linear saw according to claim 1, wherein
the machining part has a saw-teeth structure with paths opened at left and right sides.

9. The linear saw according to claim 1, wherein
the machining part has an inverted-teeth structure.

10. The linear saw according to claim 1, wherein
the machining part comprises a saw-teeth structure, and the saw-teeth structure has a wide-teeth structure or a teeth structure of varying lengths.

11. The linear saw according to claim 1, wherein
a length of the space-keeping part ranges from 16 mm to 27 mm.

12. The linear saw according to claim 11, wherein
the length of the space-keeping part ranges from 24 mm to 26 mm.

13. The linear saw according to claim 1, wherein
the linear saw cuts the workpiece which is a raw plate of a knife template, of which a material is one or more of wood, a PVC material, a bakelite material, an acrylic material, plastic, aluminum, iron, and copper.

14. The linear saw according to claim 1, wherein the linear saw comprises: a saw tooth or saw teeth and a saw back,
wherein a segment, disposed with the saw tooth or saw teeth, of the linear saw is the machining part;
the space-keeping part is formed on a section, which is connected to the machining part and is not disposed with the saw tooth or saw teeth, of the saw back;
a length of the space-keeping part is greater than a thickness of a workpiece of the linear saw; and
a thickness of at least one segment of the saw back is less than a maximum width of the machining part, or a thickness of a segment, on which the space-keeping part is disposed, of the saw back is less than a maximum width of the machining part, or a thickness of the space-keeping part is less than a maximum width of the machining part.

15. The linear saw according to claim 14, wherein
a segment, supporting the machining part, of the saw back of the linear saw has a stepped or semicircle or triangular or trapezoidal transition structure.

16. A numerical controlled machining device, wherein
the numerical controlled machining device comprises two numerical controlled motors and a linear saw described in claim 1;
the numerical controlled motors include a vibration motor and a moving motor;
the vibration motor is used for controlling the linear saw to vibrate in a linear extension direction of the linear saw; and
the moving motor is used for controlling the linear saw to make a translation movement in a plane perpendicular to the linear extension direction.

17. The numerical controlled machining device according to claim 16, wherein
the numerical controlled motors further include a rotation motor, and the rotation motor is used for controlling the linear saw to rotate about a central axis of the linear saw.

18. The numerical controlled machining device according to claim 16, wherein
the numerical controlled machining device further comprises a clamping tool head and an elastic tool head;
the clamping tool head is mounted on the side of the vibration motor and is used for clamping and fastening one end of the linear saw; and
the elastic tool head is directly or indirectly connected to the other end of the linear saw, and the elastic tool head comprises a pressure spring or a pull spring.

19. A machining method using a linear saw, comprising:
cutting a workpiece with a machining part of the linear saw of the linear saw to form a slot in the workpiece; and
wherein a space-keeping part of the linear saw does not contact the slot or is not subjected to an acting force from the slot when the space-keeping part of the linear saw passes through the slot, and
wherein the space-keeping part is arranged to ensure that the saw blade will not be deformed by the reaction force when the machining part rotates, a width of the space-keeping part is less than a maximum width of the machining part, and
a thickness of the space-keeping part is less than a maximum machining width of the machining part,
wherein the machining part, the fixing part and the space-keeping part of the linear saw are assembled together to form the linear saw.

* * * * *